US012683168B2

(12) United States Patent
Han et al.

(10) Patent No.: US 12,683,168 B2
(45) Date of Patent: Jul. 14, 2026

(54) ANODE FOR LITHIUM SECONDARY BATTERY AND METHOD FOR MANUFACTURING SAME

(71) Applicants:Hyundai Motor Company, Seoul (KR); Kia Corporation, Seoul (KR)

(72) Inventors: Sang Wook Han, Ansan-si (KR); Geun Ho Choi, Suwon-si (KR); Kyeong Wi Park, Suwon-si (KR); Hyun Jin Kim, Daegu (KR); Yong Il Cho, Seoul (KR); Han Nah Song, Ansan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 711 days.

(21) Appl. No.: 18/074,035

(22) Filed: Dec. 2, 2022

(65) Prior Publication Data
US 2023/0361306 A1 Nov. 9, 2023

(30) Foreign Application Priority Data
May 3, 2022 (KR) ........................ 10-2022-0054524

(51) Int. Cl.
| *H01M 4/62* | (2006.01) |
| *C08K 3/04* | (2006.01) |
| *H01M 4/02* | (2006.01) |
| *H01M 4/04* | (2006.01) |
| *H01M 4/133* | (2010.01) |
| *H01M 4/1393* | (2010.01) |
| *H01M 4/587* | (2010.01) |

(52) U.S. Cl.
CPC ............. *H01M 4/623* (2013.01); *C08K 3/042* (2017.05); *H01M 4/043* (2013.01); *H01M 4/0471* (2013.01); *H01M 4/133* (2013.01); *H01M 4/1393* (2013.01); *H01M 4/587* (2013.01); *C08K 2201/001* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| 5,910,378 | A | 6/1999 | Debe et al. |
| 2002/0168569 | A1 | 11/2002 | Barriere et al. |
| 2015/0303481 | A1* | 10/2015 | Duong .................. H01M 4/622 241/5 |
| 2017/0214051 | A1* | 7/2017 | Yoon ................. H01M 10/0525 |
| 2018/0277847 | A1* | 9/2018 | Saidi ..................... H01M 4/623 |
| 2023/0299261 | A1* | 9/2023 | Kondo .................... H01M 4/04 429/217 |
| 2024/0178399 | A1* | 5/2024 | Falzone ............... C09D 127/18 |
| 2024/0421315 | A1* | 12/2024 | Inoue ............... H01M 10/0562 |

FOREIGN PATENT DOCUMENTS

| KR | 20200138263 | A | 12/2020 |
| KR | 102261501 | B1 | 6/2021 |

* cited by examiner

*Primary Examiner* — Kevin M Bernatz
(74) *Attorney, Agent, or Firm* — Fish & Richardson P.C.

(57) ABSTRACT
Disclosed is an anode for a lithium secondary battery, and more particularly, an anode comprising a fibrillated binder and a particulate binder.

17 Claims, 3 Drawing Sheets

[FIG. 1]
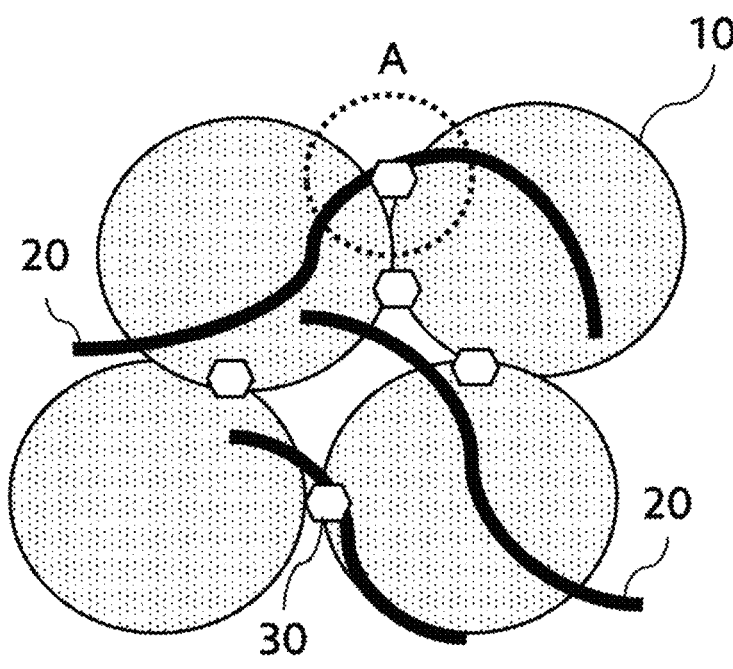

[FIG. 2]
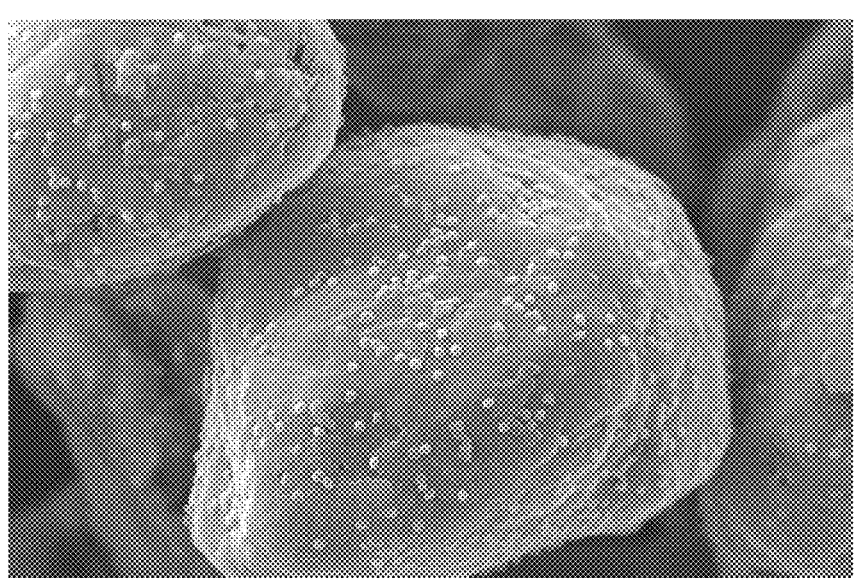

[FIG. 3]
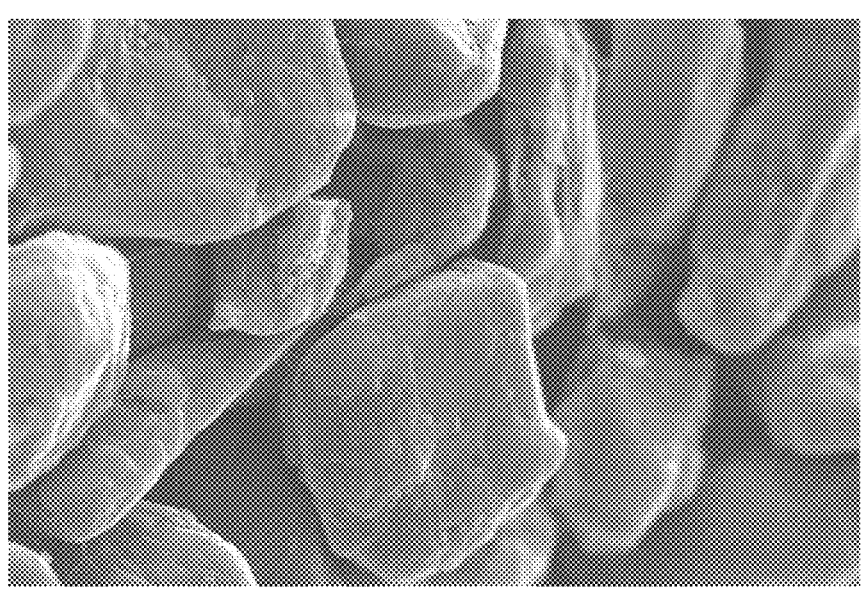

ANODE FOR LITHIUM SECONDARY BATTERY AND METHOD FOR MANUFACTURING SAME

CROSS-REFERENCE TO RELATED APPLICATION

This application claims priority from Korean Patent Application No. 10-2022-0054524, filed on May 3, 2022, the disclosure of which is incorporated herein by reference in its entirety.

TECHNICAL FIELD

The present disclosure relates to an anode for a lithium secondary battery, and more particularly, to an anode comprising a fibrillated binder and a particulate binder.

BACKGROUND

A method for manufacturing an electrode for a lithium secondary battery through the dry process is being developed as a process which reduces the cost and time, and is eco-friendly since it not only does not use a solvent unlike the method for manufacturing an electrode through the existing wet process, but also does not comprise a drying process. Currently, much research has been done on a method and material for manufacturing the dry electrode, but research regarding improving the physical properties of the dry electrode film is insufficient.

SUMMARY

According to the present disclosure, an object of the present disclosure is to provide a method for manufacturing an anode capable of shortening the process time by not having to additionally perform a process such as milling in manufacturing an electrode by a dry method.

According to the present disclosure, another object of the present disclosure is to provide a composition having improved dispersibility in manufacturing an electrode by a dry method.

According to the present disclosure, another object of the present disclosure is to provide a method capable of improving the tensile strength of an electrode film manufactured by a dry method.

The objects of the present disclosure are not limited to the objects mentioned above. The objects of the present disclosure will become clearer from the following description, and will be realized by means and combinations thereof described in the claims.

An anode for a lithium secondary battery according to one implementation of the present disclosure may include: an active material including a carbon material; a fibrillated binder; and a particulate binder comprising at least one selected from the group consisting of polytetrafluoroethylene (PTFE), polyvinylidene fluoride (PVDF), and combinations thereof.

Polytetrafluoroethylene (PTFE) may have an average particle size of about 0.1 μm to 500 μm.

Polytetrafluoroethylene (PTFE) may include a secondary particle in which a plurality of primary particles are agglomerated.

Polytetrafluoroethylene (PTFE) may have a bulk density of about 350 g/l to 450 g/l.

Polytetrafluoroethylene (PTFE) may have a BET specific surface area of about 3 $m^2$/g or less.

Polytetrafluoroethylene (PTFE) may not have free-flowing property.

Polyvinylidene fluoride (PVDF) may have an average particle size of about 0.1 μm to 500 μm.

Polyvinylidene fluoride (PVDF) may include a primary particle.

Polyvinylidene fluoride (PVDF) may have a melting point of about 170° C. or less.

Polyvinylidene fluoride (PVDF) may have a number-average molecular weight (Mn) of about 500,000 g/mol to 800,000 g/mol.

Polyvinylidene fluoride (PVDF) may have a weight-average molecular weight (Mw) of about 500,000 g/mol to 800,000 g/mol.

The anode may include an amount of about 95% by weight to 97% by weight of the active material; an amount of about 1% by weight to 4% by weight of the fibrillated binder; and an amount of about 1% by weight to 2% by weight of the particulate binder.

The particulate binder and the fibrillated binder may have a weight ratio of about 1:4 to 1:1.5.

A method for manufacturing an anode for a lithium secondary battery according to one implementation of the present disclosure may include: preparing a mixture including an active material and a particulate binder comprising at least one selected from the group consisting of polytetrafluoroethylene (PTFE), polyvinylidene fluoride (PVDF), and combinations thereof; mixing the mixture and a fibrillizable binder to obtain a particle composition in nano-sized; and applying heat and pressure to the particle composition to form a film.

The mixture may be prepared by dry-mixing the active material and the particulate binder without a solvent.

The mixture may be prepared by mixing the active material and the particulate binder at a temperature of about 30° C. or less for about 60 minutes or less at a speed of about 20 m/s to 30 m/s.

The particle composition may be obtained by mixing the mixture and the fibrillizable binder at a temperature of about 80° C. or less for about 60 minutes or less at a speed of about 20 m/s to 30 m/s.

The particle composition may have an average particle size of about 1 nm to 500 nm.

To form the film, a pressure of about 0.1 ton per square inch (TSI) to 12 TSI may be applied to the particle composition.

According to the present disclosure, it is possible to provide a method for manufacturing an anode capable of shortening the process time by not having to additionally perform a process such as milling in manufacturing an electrode by a dry method.

According to the present disclosure, it is possible to provide a composition having improved dispersibility in manufacturing an electrode by a dry method.

According to the present disclosure, it is possible to provide a method capable of improving the tensile strength of an electrode film manufactured by a dry method.

The effects of the present disclosure are not limited to the above-mentioned effects. It should be understood that the effects of the present disclosure include all effects that can be inferred from the following description.

BRIEF DESCRIPTION OF THE DRAWINGS

FIG. 1 shows an example of an internal structure of an anode for a lithium secondary battery.

FIG. 2 shows a scanning electron microscope (SEM) image of an example mixture prepared by mixing an active material and a particulate binder.

FIG. 3 shows an SEM image of an example particle composition prepared by mixing a mixture and a fibrillizable binder.

DETAILED DESCRIPTION

The above objects, other objects, features and advantages of the present disclosure will be easily understood through the following preferred implementations related to the accompanying drawings. However, the present disclosure is not limited to the implementations described herein and may be implemented in other forms. Rather, the implementations introduced herein are provided so that the disclosed content may become thorough and complete, and the spirit of the present disclosure may be sufficiently conveyed to those skilled in the art.

In the present specification, terms such as "comprise", "have", etc. are intended to designate that a feature, number, step, operation, component, part, or a combination thereof described in the specification exists, but it should be understood that the terms do not preclude the possibility of the existence or addition of one or more other features, numbers, steps, operations, components, parts, or combinations thereof. Further, when a part of a layer, film, region, plate, etc. is said to be "on" other part, this includes not only the case where it is "directly on" the other part, but also the case where there is another part in the middle thereof. Conversely, when a part of a layer, film, region, plate, etc. is said to be "under" other part, this includes not only the case where it is "directly under" the other part, but also the case where there is another part in the middle thereof.

Unless otherwise specified, since all numbers, values, and/or expressions expressing quantities of components, reaction conditions, polymer compositions and formulations used in the present specification are approximate values reflecting various uncertainties of the measurement that arise in obtaining these values among others in which these numbers are essentially different, they should be understood as being modified by the term "about" in all cases. Further, when a numerical range is disclosed in this description, such a range is continuous, and includes all values from a minimum value of such a range to a maximum value including the maximum value, unless otherwise indicated. Furthermore, when such a range refers to an integer, all integers including from a minimum value to a maximum value including the maximum value are included, unless otherwise indicated.

FIG. 1 shows an internal structure of an anode for a lithium secondary battery according to the present disclosure. The anode may include an active material 10, a fibrillated binder 20, and a particulate binder 30.

According to the present disclosure, the particulate binder 30 not only imparts adhesion between adjacent active materials 10, but also improves its physical properties by combining with the fibrillated binder 20 like part A, so that it is possible to obtain an anode more stable against external impact.

The active material 10 may include a carbon material capable of intercalating and deintercalating lithium ions. The type of the carbon material is not particularly limited, and any anode active material commonly used in the technical field to which the present disclosure belongs may be included. For example, the active material 10 may include mesocarbon microbeads (MCMB), graphite such as highly oriented pyrolytic graphite (HOPG), or the like, or amorphous carbon such as hard carbon, soft carbon, or the like.

The fibrillated binder 20 may impart adhesion between the active materials 10.

The fibrillated binder 20 may include polytetrafluoroethylene (PTFE). Polytetrafluoroethylene (PTFE) used as the fibrillated binder 20 has a characteristic that can be extruded and stretched, and thus it is different from the particulate binder 30 to be described later in that stretching is possible when high pressure and high shear force are applied thereto. Polytetrafluoroethylene (PTFE) used as the fibrillated binder 20 may be in the form of a secondary particle in which a plurality of primary particles prepared by emulsification are agglomerated, and may have the properties of cross section reduction ratio.

The particulate binder 30 may include at least one selected from the group consisting of polytetrafluoroethylene (PTFE), polyvinylidene fluoride (PVDF), and combinations thereof.

Polytetrafluoroethylene (PTFE) may have an average particle size of about 0.1 μm to 500 μm. If the average particle size is less than 0.1 μm, the formation of the polymer may be unstable, and if it exceeds 500 μm, it may be difficult to uniformly pulverize the particles.

Polytetrafluoroethylene (PTFE) may include a secondary particle in which a plurality of primary particles are agglomerated. Specifically, polytetrafluoroethylene (PTFE) may consist of secondary particles. When polytetrafluoroethylene (PTFE) consists of secondary particles, it can exhibit the physical properties itself and can be uniformly dispersed. Nano-sized primary particles may be unsuitable for a dry pulverization process that does not use a solvent.

Polytetrafluoroethylene (PTFE) may have a bulk density of about 350 g/l to 450 g/l.

Polytetrafluoroethylene (PTFE) may have a BET specific surface area of about 3 $m^2/g$ or less. The lower limit of the BET specific surface area is not particularly limited, and may be, for example, about 0.1 $m^2/g$, about 0.2 $m^2/g$, about 0.3 $m^2/g$, about 0.4 $m^2/g$, or about 0.5 $m^2/g$. Exceeding the BET specific surface area of 3 $m^2/g$ refers to that the specific surface area of the particles becomes large, which means that the primary particles are small. If the primary particles are small, unstable polymer properties may be exhibited, and this may be disadvantageous during the film formation.

Polytetrafluoroethylene (PTFE) may not have free-flowing property. As it is well understood by one of ordinary skill in the art to which the present disclosure pertains, "free-flowing" may mean that particles are not materially agglomerated (e.g., not materially united, not agglomerated, or not become lumpy) due to their moisture content. Since polytetrafluoroethylene (PTFE) used in the present disclosure does not have free-flowing property, the particles may have properties of being materially agglomerated due to their own moisture content.

Polytetrafluoroethylene (PTFE) may not have the properties of cross section reduction ratio. Not having the properties of cross section reduction ratio may mean that there are not stretching properties. If it does not have the properties of cross section reduction ratio, the stretching properties may be reduced, but the strength of the film can be improved.

Polyvinylidene fluoride (PVDF) may have an average particle size of about 0.1 μm to 500 μm. If the average particle size is less than 0.1 μm, it may be difficult to form a polymer structure, and if it exceeds 500 μm, it may be difficult to uniformly pulverize the particles.

Polyvinylidene fluoride (PVDF) may include a primary particle. Specifically, polyvinylidene fluoride (PVDF) may consist of the primary particle without being agglomerated. Since the primary particle is attached to the surface of the active material when a shear force is applied, polyvinylidene fluoride (PVDF) should be consisted of the primary particle.

Polyvinylidene fluoride (PVDF) may have a melting point of about 170° C. or less.

Polyvinylidene fluoride (PVDF) may have a number-average molecular weight (Mn) of about 500,000 g/mol to 800,000 g/mol.

Polyvinylidene fluoride (PVDF) may have a weight-average molecular weight (Mw) of about 500,000 g/mol to 800,000 g/mol.

The anode may include an amount of about 95% by weight to 97% by weight of an active material, an amount of about 1% by weight to 4% by weight of a fibrillated binder, and an amount of about 1% by weight to 2% by weight of a particulate binder. When the content of the fibrillated binder exceeds 4% by weight, the tensile strength of the anode may decrease. Further, when the content of the particulate binder exceeds 2% by weight, the flexibility of the anode may be deteriorated.

The weight ratio of the particulate binder and the fibrillated binder may be preferably adjusted to about 1:4 to 1:1.5 in order to simultaneously secure high tensile strength and flexibility of the anode.

Hereinafter, a method for manufacturing an anode according to the present disclosure will be described.

The method for manufacturing an anode for a lithium secondary battery according to the present disclosure may include preparing a mixture including an active material and the particulate binder, mixing the mixture and a fibrillizable binder to obtain a particle composition in nano-sized, and applying heat and pressure to the particle composition to form a film.

The mixture may be prepared by mixing the active material and the particulate binder.

Since the particulate binder has a micrometer-sized average particle size, it may be uniformly mixed with the active material without a separate pulverization process.

Further, since the particulate binder does not have free-flowing property, it may be agglomerated and mixed with the active material even without adding a liquid material such as a solvent. Therefore, the active material and the particulate binder may be mixed in a dry manner without a solvent.

Specifically, the mixture may be prepared by mixing the active material and the particulate binder at a temperature of about 30° C. or less for about 60 minutes or less at a speed of about 20 m/s to 30 m/s.

The particulate binder is characterized in that fibrillization does not proceed due to high shear mixing.

Next, the particle composition may be obtained by mixing the mixture with the fibrillizable binder.

The fibrillizable binder may correspond to a precursor of the above-described fibrillated binder, and may be a material that is fibrillized when a shear stress is applied.

The particle composition may be obtained by mixing the mixture and the fibrillizable binder at a temperature of about 80° C. or less for about 60 minutes or less at a speed of about 20 m/s to 30 m/s.

Through this, the particle composition may be obtained, and the particle composition may have an average particle size of about 1 nm to 500 nm.

The manufacturing method may further including cooling and packaging the particle composition before forming a film. For example, the particle composition may be packaged by cooling it at a temperature of about 20° C. or less. An anode may be obtained by applying heat and pressure to the particle composition, thereby forming the film.

Specifically, the film may be formed by applying a pressure of about 0.1 ton per square inch (TSI) to 12 TSI to the particle composition at a temperature of about 30° C. to 160° C.

Hereinafter, the present disclosure will be described in more detail through specific examples. However, these examples are for illustrating the present disclosure, and the scope of the present disclosure is not limited thereto.

EXAMPLES

Anodes were manufactured through the following process.

Graphite, which is an active material, was dry-mixed with a particulate binder at a rotation speed of about 25.5 m/s using an Intensive Mixer (Eirich) without a solvent to prepare a mixture (mixed at a temperature of within 40° C. for within 60 minutes).

A fibrillizable binder was additionally added to the mixture and mixed at a rotation speed of about 25.5 m/s to obtain a particle composition in nano-sized (mixed at a temperature of within 80° C. for within 60 minutes).

The particle composition was packaged by cooling it to 20° C. or less.

Anodes were manufactured by forming a film while applying heat and pressure to the packaged particle composition (heat of 100° C. and a pressure of 1 TSI).

The types and contents of the active materials, the particulate binders, and the fibrillizable binders in the respective Examples and Comparative Examples are as shown in Table 1 below.

TABLE 1

| | Composition | | | | |
| --- | --- | --- | --- | --- | --- |
| | Active material (% by weight) | Fibrillizable binder (% by weight) | Particulate binder (% by weight) | | |
| Classification | Graphite | PTFE | PVdF | CMC | PTFE |
| Example 1 | 96 | 3 | — | — | 1 |
| Example 2 | 97 | 2 | — | — | 1 |
| Example 3 | 97 | 2 | 1 | — | — |
| Comparative Example 1 | 97 | 3 | — | — | — |
| Comparative Example 2 | 97 | — | — | — | 3 |
| Comparative Example 3 | 97 | — | 3 | — | — |
| Comparative Example 4 | 96 | 4 | — | — | — |
| Comparative Example 5 | 96 | 1 | — | — | 2 |
| Comparative Example 6 | 96 | 2 | — | — | 2 |
| Comparative Example 7 | 96 | 2 | 1 | 1 | — |

FIG. 2 shows the mixture prepared by mixing the active material and the particulate binder in Example 3 with a scanning electron microscope (SEM). It can be seen that the particulate binder is uniformly adhered to the surface of the active material.

FIG. 3 shows the particle composition prepared by mixing the mixture and the fibrillizable binder in Example 3 with an SEM. It can be seen that, while the active material and the particulate binder form a uniform phase, the fibrillated binder connects between the respective particles.

Experimental Example

Tensile strength (N), thickness (μm), appearance, and flexibility with respect to the anodes manufactured in the Examples and Comparative Examples were measured and observed, and the results are shown in Table 2 below.

TABLE 2

| | Physical properties | | | |
| --- | --- | --- | --- | --- |
| | Tensile strength | Film thickness | Film appearance | Film flexibility |
| Example 1 | 1.82 | 280 | ○ | ○ |
| Example 2 | 1.26 | 280 | ○ | ○ |
| Example 3 | 1.87 | 230 | ○ | ○ |
| Comparative Example 1 | 1.07 | 280 | ○ | ○ |
| Comparative Example 2 | — | — | X | X |
| Comparative Example 3 | — | — | X | X |
| Comparative Example 4 | 0.86 | 280 | Δ | ○ |
| Comparative Example 5 | — | 280 | X | X |
| Comparative Example 6 | 1.90 | 280 | Δ | X |
| Comparative Example 7 | 1.74 | 298 | ○ | — |

Referring to the results of the Examples and Comparative Examples, it can be seen that the physical properties were the most excellent at 1% by weight of PTFE as a particulate binder under a specific weight ratio of the particulate binder/fibrillated binder when the binder content was within 4% by weight. Further, it can be seen that the physical properties were the most excellent at 1% by weight of PVdF as a particulate binder under a specific weight ratio of the particulate binder/fibrillated binder when the total binder content was within 3% by weight.

Meanwhile, it can be seen that if the content of the fibrillated binder is low, and the content of the particulate binder is high, mechanical properties such as tensile strength are improved, but appearance characteristics and flexibilities of the anodes are deteriorated.

Hereinabove, implementations of the present disclosure have been described with reference to the accompanying drawings, but those with ordinary skill in the art to which the present disclosure pertains will understand that the present disclosure may be implemented in other specific forms without changing the technical spirit or essential features thereof. Therefore, it should be understood that the implementations described above are illustrative in all respects and not restrictive.

What is claimed is:

1. An anode for a lithium secondary battery, comprising:
an active material comprising a carbon material;
a fibrillated binder; and a particulate binder comprising at least one of polytetrafluoroethylene (PTFE), polyvinylidene fluoride (PVDF), or any combination thereof,
wherein the anode comprises:
an amount of about 95% by weight to 97% by weight of the active material,
an amount of about 1% by weight to 4% by weight of the fibrillated binder, and
an amount of about 1% by weight to 2% by weight of the particulate binder.

2. The anode of claim 1, wherein the PTFE has an average particle size of about 0.1 μm to 500 μm.

3. The anode of claim 1, wherein the PTFE comprises a secondary particle including a plurality of primary particles.

4. The anode of claim 1, wherein the PTFE has a bulk density of about 350 g/l to 450 g/l.

5. The anode of claim 1, wherein the PTFE has a BET specific surface area of about 3 $m^2/g$ or less.

6. The anode of claim 1, wherein the PVDF has an average particle size of about 0.1 μm to 500 μm.

7. The anode of claim 1, wherein the PVDF includes a primary particle.

8. The anode of claim 1, wherein the PVDF has a melting point of about 170° C. or less.

9. The anode of claim 1, wherein the PVDF has a number-average molecular weight (Mn) of about 500,000 g/mol to 800,000 g/mol.

10. The anode of claim 1, wherein the PVDF has a weight-average molecular weight (Mw) of about 500,000 g/mol to 800,000 g/mol.

11. The anode of claim 1, wherein the particulate binder and the fibrillated binder have a weight ratio of about 1:4 to 1:1.5.

12. A method for manufacturing the anode of claim 1 comprising:
preparing a mixture including the active material and the particulate binder;
mixing the mixture and a fibrillizable binder to obtain a particle composition, wherein the fibrillizable binder corresponds to a precursor to the fibrillated binder; and
applying heat and pressure to the particle composition to form a film.

13. The method of claim 12, wherein the mixture is prepared by dry-mixing the active material and the particulate binder without a solvent.

14. The method of claim 12, wherein the mixture is prepared by mixing the active material and the particulate binder at a temperature of about 30° C. or less for about 60 minutes or less at a speed of about 20 m/s to 30 m/s.

15. The method of claim 12, wherein the particle composition is obtained by mixing the mixture and the fibrillizable binder at a temperature of about 80° C. or less for about 60 minutes or less at a speed of about 20 m/s to 30 m/s.

16. The method of claim 12, wherein the particle composition has an average particle size of about 1 nm to 500 nm.

17. The method of claim 12, wherein the method comprises applying pressure of about 0.1 ton per square inch (TSI) to 12 TSI to the particle composition at a temperature of about 30° C. to 160° C. to form the film.

* * * * *